Figure 5:
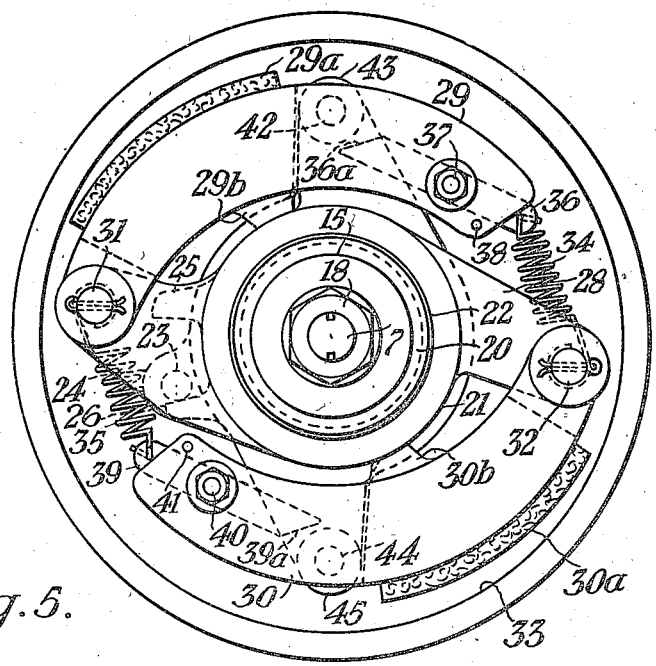

Nov. 13, 1945.  C. R. BEALL  2,388,946
SPEED GOVERNOR
Filed Jan. 1, 1943  3 Sheets-Sheet 1
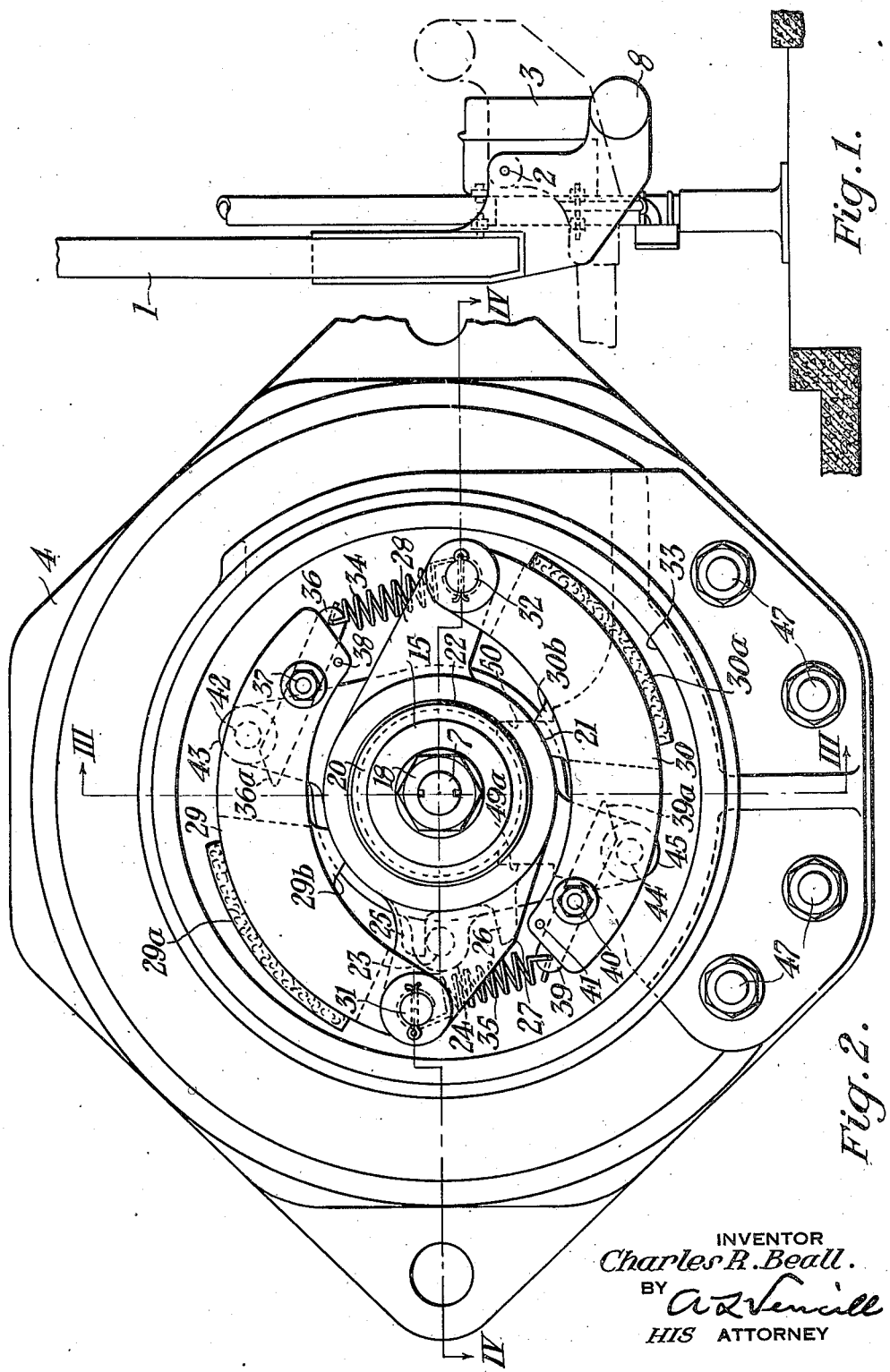
INVENTOR
Charles R. Beall.
BY
HIS ATTORNEY

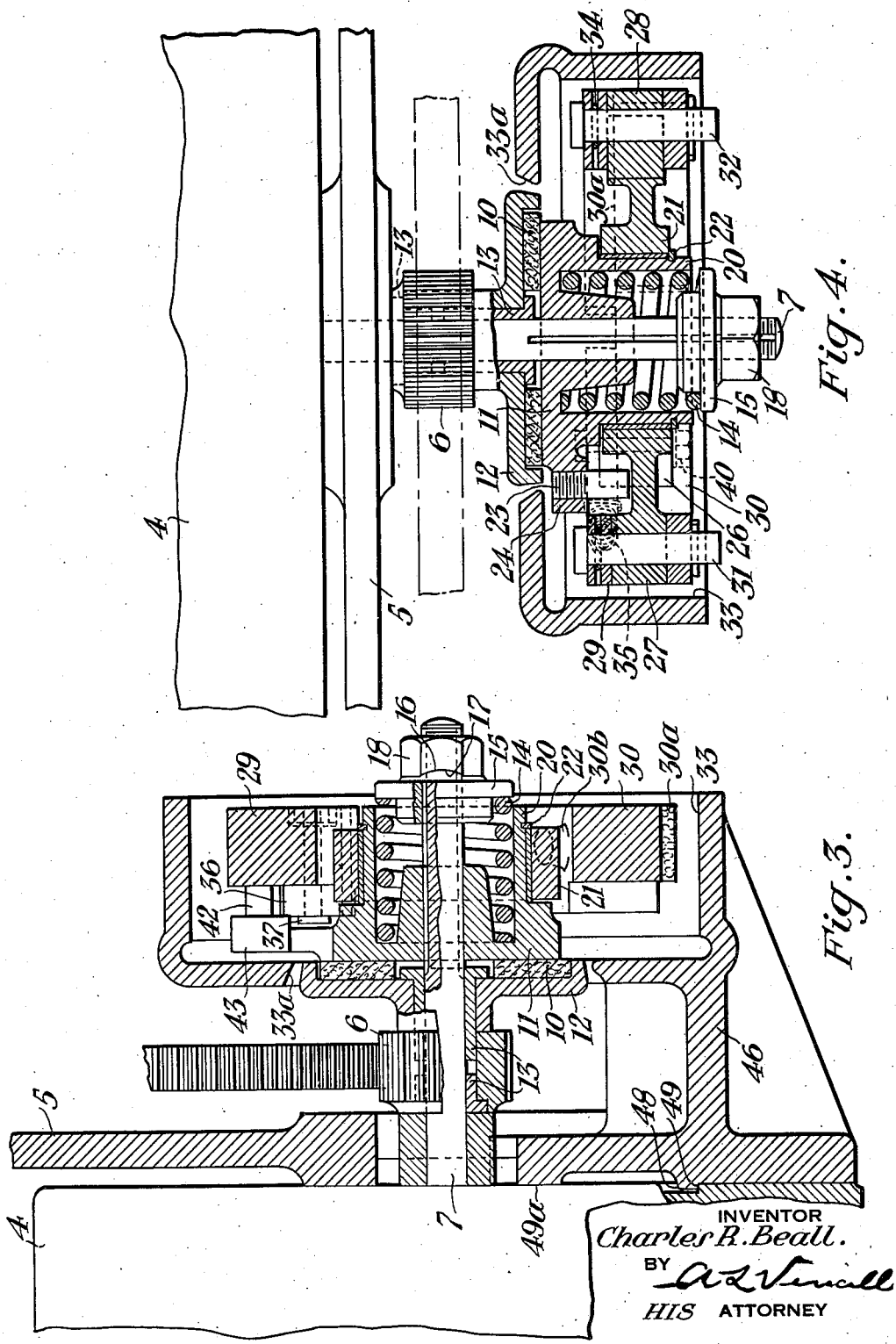

Nov. 13, 1945.                C. R. BEALL                2,388,946
                              SPEED GOVERNOR
                           Filed Jan. 1, 1943              3 Sheets-Sheet 3

INVENTOR
Charles R. Beall.
BY
HIS ATTORNEY

Patented Nov. 13, 1945

2,388,946

UNITED STATES PATENT OFFICE 2,388,946

SPEED GOVERNOR

Charles R. Beall, Edgewood, Pa., assignor to The Union Switch & Signal Company, Swissvale, Pa., a corporation of Pennsylvania Application January 1, 1943, Serial No. 471,069

6 Claims. (Cl. 188—184)

My invention relates to speed governors, and particularly to speed governors suitable for use on highway crossing gates to limit the raising and lowering speed of the gate arm.

In one well-known form of crossing gate shown and described in Letters Patent of the United States No. 2,295,419, granted to Samuel Miskelly, on September 8, 1942, the gate arm is arranged to move by gravity from its raised to its lowered position and to be returned to its raised position by an electric motor. It has recently been proposed to modify the operating mechanism for this gate so that the motor will not only be effective to raise the gate arm, but will also be effective to drive the gate arm at least part way from its raised to its lowered position to insure against the gate arm being held clear by some abnormal condition such as a high wind or the formation of ice. In normal operation it is desired to have the gate arm lower in 12 seconds which corresponds to one motor speed, and to clear in 8 seconds which corresponds to a somewhat higher motor speed.

One object of my present invention is to provide a speed governor in the form of a centrifugally operated drum type friction brake for application to the motor shaft of a gate of the type shown in said patent, which governor will frictionally limit the motor speed to the desired value while the gate arm is being lowered, but which will not exert any braking force on the motor while the gate arm is being raised unless the motor attains a speed higher than the normal clearing speed, due for example, to the gate arm having become broken off while it is in its lowered position.

According to my invention, the governor comprises brake shoes mounted inside of a stationary brake drum on a brake shoe support which is constrained to rotate with the motor shaft but which is free to move through a limited angular distance relative to the motor shaft. The brake shoes are biased out of engagement with the brake drum by spring means, and are adapted to be moved into engagement with the brake drum in opposition to the bias of the spring means by centrifugal force. The spring means are connected with the brake shoes through a lever arrangement having a variable lever ratio which causes the biasing force to have one value when the brake shoe support occupies one angular position relative to the motor shaft and another value when the brake shoe support occupies its other angular position. Normally the support shifts by inertia from one angular position to the other relative to the motor shaft when the direction of rotation of the motor shaft is reversed, but the parts are so arranged that if the support fails to shift its angular position for any reason such as friction when the direction of rotation of the motor shaft is reversed, when the motor speed increases to a sufficiently high value which is somewhat higher than the normal value at which the shoes engage the brake drum the shoes will then frictionally engage the drum and the resultant angular torque will cause the support to shift and thereby cause the brake to limit the motor speed to the proper speed for that direction of rotation.

Other objects and characteristic features of my invention will become apparent as the description proceeds.

I shall describe one form of governor embodying my invention, and shall then point out the novel features thereof in claims.

Figure 6:
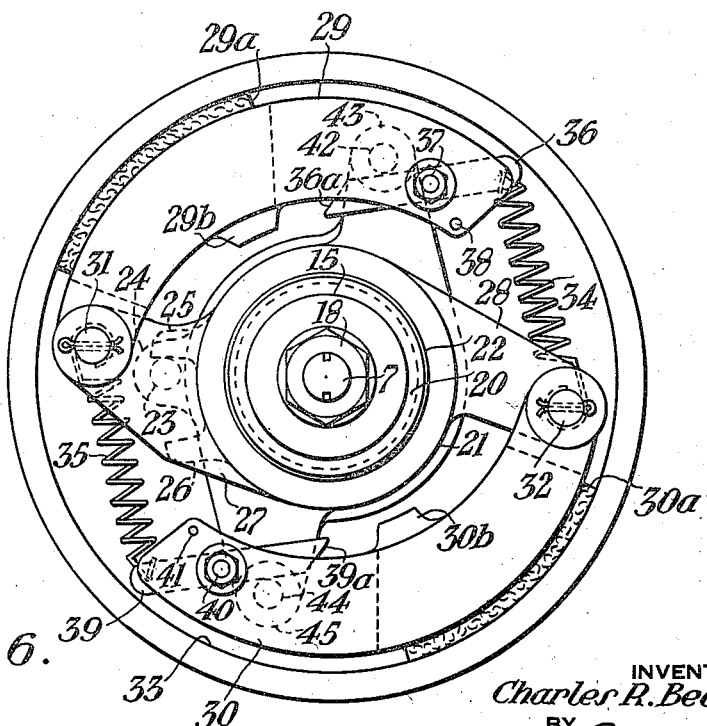

In the accompanying drawings, Fig. 1 is a side elevational view showing a highway crossing gate operated by a motor driven mechanism the motor of which is provided with a speed governor embodying my invention. Fig. 2 is an enlarged end view showing the governor embodying my invention mounted in the intended manner on the motor of the gate operating mechanism shown in Fig. 1. Figs. 3 and 4 are sectional views taken on the lines III—III and IV—IV, respectively, of Fig. 2. Figs. 5 and 6 are views similar to Fig. 2 showing various parts of the governor in positions they assume under different operating conditions.

Similar reference characters refer to similar parts in each of the several views.

As was pointed out hereinbefore, a governor embodying my invention is constructed primarily for application to the motor of the operating mechanism of an automatic crossing gate of the type shown in Letters Patent of the United States No. 2,295,419, and accordingly for convenience in illustrating and describing my invention I have shown it applied to the motor of this particular operating mechanism. It should be distinctly understood, however, that it is not limited to this particular use, but on the contrary is useful wherever it is desirable to frictionally impose one speed limit on a member when it is rotated in one direction by power means such as an electric motor and another speed limit on the member when it is rotated in the opposite direction by the power means.

Referring now to Fig. 1, the crossing gate here illustrated comprises the usual roadway arm 1 mounted on the operating shaft 2 of an operating mechanism 3 of the type shown in Letters Patent of the United States No. 2,295,419 referred to above. Inasmuch as this mechanism in itself forms no part of my present invention and is described in detail in the said patent, it is believed to be sufficient for purposes of the present disclosure to point out that this mechanism includes an electric motor 4 (see Fig. 3) secured to one wall 5 of the mechanism casing, and connected through a friction clutch which I shall describe presently with a pinion 6 mounted on the shaft 7 of the motor. The pinion 6, in turn, is connected through a suitable gear train with the gate arm operating shaft 2, whereby rotation of the motor will raise or lower the gate arm depending upon the direction of rotation. The mechanism also includes an electromagnet (not shown) which becomes energized when the gate arm is moved to its raised position and which, when energized, is effective to prevent rotation of the gate arm in the direction to cause it to lower. The gate arm is biased by gravity to move to its lowered position when the electromagnet becomes deenergized, and is connected with counterweights 8 for adjusting the lowering torque to the desired value. Heretofore, the motor has only been energized when it is desired to raise the gate arm, and gravity has been relied upon entirely to effect the lowering of the gate arm. However, when the motor is provided with the governor embodying my present invention, it is contemplated that the motor will also be energized during at least the first part of the stroke of the gate arm from its raised to its lowered position to insure that the gate arm will not be retained in its clear position at any time due to some abnormal condition such as a high wind or a formation of ice which tends to hold the gate arm in its clear position. The mechanism further includes suitable circuit controlling contacts for controlling the energization of the motor to obtain the desired operation of the gate.

Referring now to Figs. 2, 3 and 4, as here illustrated, the governor embodying my invention is applied to the electric motor 4, and in order to save space and materials it is combined with the previously referred to friction clutch which is provided to protect the mechanism gearing from excessive strains such as might occur in the event that the mechanism is brought to a sudden stop due for example to the movement of the gate arm being interfered with by a vehicle. The friction clutch is mounted on the right-hand end of the motor shaft 7, as viewed in Fig. 3, and in the form here shown comprises a friction disc 10 disposed between a driving member 11 and a driven member 12. The driven member 12 is formed integrally with the pinion 6, and the hubs of these two parts are provided with self-lubricating bushings 13 which rotatably receive the motor shaft. The driving member 11 is splined on shaft 7, and is biased to the longitudinal position on the shaft in which the two members and the friction disc are frictionally held together by means of a coil spring 14 which surrounds the motor shaft between the driving member and a washer 15. The washer 15 is also splined to the shaft 7, and is provided on its outer face with rounded diametrically opposite projections 16 which cooperate with rounded diametrically opposite recesses 17 formed on the inner face of a nut 18 screwed onto the outer end of the motor shaft. It will be apparent that the force required to slip the clutch will depend upon the amount of compression of the spring 14, and that the compression of this spring can be readily varied by adjusting nut 18. It will also be apparent that the cooperation between the recesses 17 in the nut 18 and the projections 16 on the spring washer 15 makes the nut self-locking in positions half a turn apart, thereby enabling the desired adjustment to be readily obtained.

According to my invention, the governor comprises a brake shoe carrier 21 mounted with some clearance on a tubular projection 20 provided on the driving member 11 at the side opposite to the friction disc 10. The brake shoe carrier 21 is held in place on the projection 20 by means of a snap ring 22, and is constrained to rotate with the driving member by means of a driving pin 23 (see Figs. 2 and 4). The driving pin 23 is secured to a laterally projecting lug 24 formed on the driving member and projects between and cooperates with two driving ribs 25 and 26 formed on the rear side, as viewed in Fig. 2, of an arm 27 provided on the brake shoe carrier. The driving ribs 25 and 26 are angularly spaced apart a sufficient distance to permit a limited amount of angular movement between the driving member and the brake shoe carrier for a purpose which will be made clear presently. The brake shoe carrier is provided in addition to the arm 27 with a second diametrically opposite arm 28. Governor elements in the form of brake shoes 29 and 30 are pivotally attached to the arms 27 and 28 by means of pivot pins 31 and 32, and are provided with brake linings 29a and 30a which cooperate with a brake drum 33. The brake shoes are also provided with stop pads 29b and 30b which cooperate with the outer surface of the brake shoe carrier 21 to limit the movement of the brake shoes away from the brake drum, and the shoes are constantly biased to the positions in which the stop pads engage the brake shoe carrier by means of biasing springs 34 and 35. The spring 34 is secured at one end to the pivot pin 32 and is operatively connected at the other end with one end of a lever 36. The lever 36 is pivotally secured intermediate its ends to the brake shoe 29 at the end opposite to the pivot pin 31 by means of a bolt 37, and cooperates between the bolt 37 and the point at which the spring 34 is attached to the lever with a stop pin 38 which limits the angular rotation of the lever 37 due to the force applied thereto by the biasing spring. The free end of the lever 36 is formed with a beveled surface 36a and cooperates with a lockout pin 42 secured to a laterally projecting arm 43 provided on the driving member 11. The parts are so proportioned that when the brake shoe carrier 21 occupies the angular position relative to the driving member 11 in which the driving pin 23 engages the driving lug 26, as shown in Fig. 5, the pin 42 will be out of the path of movement of the lever 36 in response to movement of the brake shoe 29 to its braking position but that when the brake shoe carrier occupies the angular position relative to the driving member 11 in which the driving pin 23 engages the driving lug 25, as shown in Fig. 2, the pin 42 will then project into the path of movement of the lever in such manner that the lever will become a lever of the third class with the pin 42 acting as the fulcrum. It will be obvious that when the lever is functioning as a lever of the third class the force necessary to move the brake shoe 29 to its braking position will be materially increased.

The spring 35 is similarly secured at one end to the pivot pin 31 and is operatively connected at the other end to one end of a lever 39. The lever 39 is pivotally secured intermediate its ends to the brake shoe 30 at the end opposite to the pivot pin 32 by means of a bolt 40, and cooperates between the bolt 40 and the point at which the spring 35 is attached to the lever with a stop pin 41 which limits the angular rotation of the lever 39 due to the force applied thereto by the biasing spring. The free end of the lever 39 is formed with a beveled surface 39a, and cooperates with a lockout pin 44 secured to a laterally projecting arm 45 provided on the driving member 11. The manner in which the lockout pin cooperates with the lever 44 is identical with that in which the lockout pin 42 cooperates with the lever 36, and will be obvious from the drawings without further description.

The brake drum 33 is formed integrally with a bracket 46 which is secured by means of four bolts 47 to the one end bell of the motor 4. The bracket is maintained in concentric relation to the motor shaft 7 by means of an arcuate rib 48 which fits into an arcuate groove 49 machined into the motor end bell, and is maintained in the desired angular position relative to the mechanism casing by a tongue 49a (Fig. 2) which fits into a vertical slot 50 formed in the wall 5 of the casing directly below the opening for the motor shaft. The rear wall of the brake drum is formed with an opening 33a which receives the driven member 12 of the friction clutch with some clearance.

As shown in Figs. 2, 3 and 4, the various parts of the governor occupy the positions they occupy when the gate arm 1 is in its raised position and the motor 4 is deenergized. That is to say, the brake carrier 21 is rotated to the relative position with respect to the driving member 11 in which the driving pin 23 engages the driving rib 25, so that the lockout pins 42 and 44 are disposed in the path of movement of the associated levers 36 and 39, and the brake shoes are held in their released or non-braking positions by the biasing springs 34 and 35.

In explaining the operation of the governor as a whole I shall assume that with the parts in the positions shown in Figs. 2, 3 and 4, the motor 4 becomes energized to lower the gate arm. The energization of the motor will cause the motor shaft to rotate in a counterclockwise direction, as viewed in Fig. 2, and this rotation of the motor shaft will of course cause the driving member 11 to be rotated in the same direction. When the driving member starts to rotate, the inertia of the brake carrier and brake shoes will tend to hold these parts stationary, and as a result, the driving members 11 will normally initially rotate relative to the brake carrier from the position in which the driving pin 23 engages the driving rib 25 as shown in Fig. 2 to the position in which the driving pin 23 engages the driving rib 26, as shown in Fig. 5. This initial rotation will move the lockout pins 42 and 44 out of the path of movement of the levers 36 and 39 but will have no other immediate effect on the governor. As soon as this initial rotation is completed, the brake shoe carrier will be constrained to rotate with the driving member, and the parts are so proportioned that as the motor speed increases, the brake shoes will function in a manner similar to the usual governor weights and will move outwardly in response to centrifugal force from their non-braking to their braking positions at some speed below the speed at which the motor normally operates to cause the gate arm to lower in the desired time interval. When the brake shoes move to their braking positions, the brake linings will frictionally engage the brake drums, and will thus exert a braking force which is proportional to the square of the motor speed. The parts are further so proportioned that this braking force will limit the lowering speed to the desired value even under adverse operating conditions such as the presence of a heavy ice load on the gate arm. It should be noted that during the movement of the brake shoes to their braking positions under these conditions the levers 36 and 39 will remain in the relative positions with respect to the brake shoes in which they engage the associated stop pins 38 and 41, and the only effect of the levers is to provide a fixed connection between the biasing springs and the brake shoes.

I shall now assume that the gate arm is in its lowered position and that the motor is energized to raise the gate arm. Under these conditions the parts of the governor will initially occupy the positions in which they are shown in Fig. 5, and the motor shaft will rotate in a clockwise direction as viewed in Fig. 2. As soon as the motor shaft starts to rotate, the inertia of the brake carrier and associated parts will normally cause the driving member to move relative to the brake carrier from the position shown in Fig. 5 to the position shown in Fig. 2. This relative rotation, in turn, will move the lockout pins 43 and 44 into the path of movement of the associated levers 36 and 39, and as a result any movement of the brake shoes toward their braking positions will cause these levers to act as third class levers with the lockout pins serving as fulcrums. When the levers act as third class levers, the biasing force exerted by the springs on the brake shoes is considerably greater than is the case when the lockout pins are out of the path of movement of the levers, and the parts are so proportioned that the centrifugal force exerted on the brake shoes under these conditions will not be sufficient to move the brake shoes to their braking positions at the normal raising or clearing speed. If, however, the motor speed increases above the normal clearing speed for any reason when the gate arm is being raised, as might happen due to the unbalanced torque of the counterweights 8 in the event the gate arm becomes broken off while the gate arm is in its lowered position, the increased motor speed will then cause the brake shoes to move to their braking positions as shown in Fig. 6, and thereby limit the motor speed to a speed slightly higher than the normal clearing speed.

It should be particularly pointed out that if the inertia of the brake shoe carrier and associated parts does not cause the driving member to move relative to the brake shoe carrier from the position shown in Fig. 2 to the position shown in Fig. 5 when the gate arm starts to lower, the brake shoes will be locked out of engagement with the brake drum at speeds up to the normal clearing speed. However, under these conditions, the unbalanced load of the gate arm will soon cause the motor speed to increase above the normal clearing speed, and when this happens, the centrifugal force acting on the brake shoes will be sufficient to cause the levers 36 and 39 to rotate about the lockout pins as fulcrums a sufficient amount to permit engagement of the brake linings with the brake drums. As soon as the brake shoes engage the brake drums, the resulting frictional drag will cause relative rotation of the driving member and brake shoe carrier to the position shown in Fig. 5. This relative rotation of the driving member and brake shoe carrier will move the lockout pins out of engagement with the levers, and will thus decrease the biasing force exerted by the biasing springs to the normal value, whereupon the governor will then act to retard the lowering speed of the gate arm to its normal value.

If the inertia of the brake shoe carrier and associated parts fail to move the lockout pins into the path of movement of the levers when the motor is operated to raise the gate arms, the shoes will move into engagement with the brake drum at some speed below the normal clearing speed, and the friction between the shoes and the drum when the shoes first engage the drum will cause relative rotation of the driving member and brake shoe carrier which rotation will bring lockout pins 42 and 44 into engagement with the beveled surfaces 36a and 39a of levers 36 and 39, and will thus change these levers to levers of the third class. The force of the springs acting in opposition to centrifugal force will therefore be increased thus reducing the braking action to such an extent that the speed of operation is only slightly reduced.

Although I have herein shown and described only one form of governor embodying my invention, it is understood that various changes and modifications may be made therein within the scope of the appended claims without departing from the spirit and scope of my invention.

Having thus described my invention, what I claim is:

1. A governor comprising a driving member, a second member constrained to rotate with said driving member but free to move due to its inertia through a limited angular distance relative to said driving member, governor elements pivotally attached to said second member, and biasing means connected with said governor elements for biasing said elements to one position, said biasing means being connected with said elements through means responsive to the relative angular positions of said driving member and said second member and effective to cause said biasing means to exert on said elements one biasing force when said driving member is rotated in one direction and another biasing force when said driving member is rotated in the opposite direction.

2. A governor comprising a driving member, a second member constrained to rotate with said driving member but free to move from one angular position to another relative to said driving member, brake shoes pivotally attached to said second member, a brake drum surrounding said members and cooperating with said brake shoes, spring means for biasing said brake shoes to non-braking positions, and means for varying the biasing force exerted by said spring means according as said two members occupy said one or said other relative angular position, said second member and said brake shoes having sufficient inertia to cause said second member to occupy its one or its other angular position relative to said driving member according as said driving member is rotated in one direction or the other.

3. A governor comprising a driving member, a brake shoe carrier constrained to rotate in response to rotation of said driving member but free to move due to its inertia from one angular position to another in response to a change in the direction of rotation of said driving member, brake shoes pivotally attached to said carrier for movement by centrifugal force from non-braking to braking positions, and spring means for biasing said brake shoes to their non-braking positions connected with the shoes by means which varies the spring force exerted by said spring means according as said carrier is rotated to its one or its other angular position relative to said driving member.

4. A governor comprising a driving member, a brake shoe carrier constrained to rotate in response to rotation of said driving member but free to move due to inertia from one angular position to another in response to a change in the direction of rotation of said driving member, brake shoes pivotally attached to said carrier for movement by centrifugal force from non-braking to braking positions, a lever attached intermediate its ends to the free end of each brake shoe, a spring connected with each lever for biasing the associated shoe to its non-braking position, means secured to said brake shoes and cooperating with said levers to limit rotation of the levers by said springs, and two lockout pins secured to said driving member in such positions that when said carrier occupies its one angular position relative to said driving member said lockout pins will act as fulcrums for said levers and will cause them to function as third class levers in response to movement of said brake shoes toward their braking positions but that when said carrier occupies its other angular position relative to said driving member said pins will be out of the path of movement of said levers in response to movement of said brake shoes toward their braking positions, whereby said brake shoes will move to their braking positions at one or another speed of rotation of said driving member depending upon the direction of such rotation.

5. A governor comprising a driving member provided with a tubular extension, a brake shoe carrier journaled on said tubular member, a driving pin secured to said driving member and cooperating with angularly spaced driving lugs provided on said carrier whereby said carrier is constrained to rotate with said driving member but is free to rotate from one angular position to another due to its inertia in response to a change in the direction of rotation of said driving member, brake shoes pivotally attached to said carrier and provided with brake linings cooperating with a fixed brake drum, said shoes being movable by centrifugal force from non-braking to braking positions, a lever attached intermediate its ends to the free end of each brake shoe, a spring connected with each lever for biasing the associated shoe to its non-braking position, means secured to said brake shoes and cooperating with said levers to limit rotation of the levers by said springs, and two lockout pins secured to said driving member in such positions that when said carrier occupies its one angular position relative to said driving member said lockout pins will act as fulcrums for said levers and will cause them to function as third class levers in response to movement of said brake shoes toward their braking positions but that when said carrier occupies its other angular position relative to said driving member said pins will be out of the path of movement of said lever in response to movement of said brake shoes toward their braking positions, whereby said brake shoes will move to their braking positions at one or another speed of rotation of said driving member depending upon the direction of such rotation.

6. A governor comprising a driving member, a second member constrained to rotate with said driving member but free to move from one angular position to another relative to said driving member, brake shoes pivotally attached to said second member, a brake drum surrounding said members and cooperating with said brake shoes, spring means for biasing said brake shoes to non-braking positions, and means for varying the biasing force exerted by said spring means according as said two members occupy said one or said other relative angular position, said second member and said brake shoes having sufficient inertia to normally cause said second member to occupy its one or its other angular position relative to said driving member according as said driving member is rotated in one direction or the other and the parts being so proportioned that the frictional torque exerted by said brake will cause said second member to move to its one or its other angular position relative to said driving member if said second member fails to move in response to the inertia of the parts.

CHARLES R. BEALL.